United States Patent [19]

Fukuroi

[11] Patent Number: 5,043,125
[45] Date of Patent: Aug. 27, 1991

[54] METHOD OF FORMING A CHAIN OF MEANDERING COUPLING ELEMENTS FOR SLIDE FASTENERS

[75] Inventor: Takeo Fukuroi, Uozu, Japan
[73] Assignee: Yoshida Kogyo K.K., Tokyo, Japan
[21] Appl. No.: 454,745
[22] Filed: Dec. 20, 1989
[30] Foreign Application Priority Data Dec. 20, 1988 [JP] Japan .................................. 63-320839

[51] Int. Cl.$^5$ .......................... B29C 43/26; B29L 5/00
[52] U.S. Cl. ..................................... 264/146; 264/157; 264/168; 264/283; 264/296; 264/320; 425/814
[58] Field of Search ............... 264/146, 147, 157, 556, 264/168, 282, 283, 295, 320, 339, 297–298, 294, 296; 425/814

[56] References Cited

U.S. PATENT DOCUMENTS

| | | | |
|---|---|---|---|
| 3,445,915 | 5/1969 | Cuckson et al. | 264/146 |
| 3,942,237 | 3/1976 | Ongaro | 264/157 |
| 3,993,725 | 11/1976 | Brown | 264/146 |
| 4,062,919 | 12/1977 | Rojahn et al. | 264/157 |

FOREIGN PATENT DOCUMENTS

| | | | |
|---|---|---|---|
| 39-9390 | 6/1964 | Japan . | |
| 52-10363 | 1/1977 | Japan | 264/146 |

*Primary Examiner*—Jeffery Thurlow
*Assistant Examiner*—Mathieu Vargot
*Attorney, Agent, or Firm*—Hill, Van Santen, Steadman & Simpson

[57] ABSTRACT

A method of forming a chain of meandering or zig-zag coupling elements for slide fasteners includes dividing or bifurcating a continuous length of substantially cross-sectionally circular monofilamentary material axially into identical halves of substantially semi-circular cross-section immediately prior to introduction to a forming apparatus. The identical halves may be provisionally joined together to provide a cross-sectionally circular monofilament and divided back into respective halves immediately prior to formation thereof into respective rows of coupling elements for slide fasteners.

3 Claims, 4 Drawing Sheets

METHOD OF FORMING A CHAIN OF MEANDERING COUPLING ELEMENTS FOR SLIDE FASTENERS

BACKGROUND OF THE INVENTION

1. Field of the Invention

This invention relates to a method of manufacturing a chain of coupling elements for slide fasteners and has particular reference to a method of forming a chain of such coupling elements from a monofilamentary material having a semi-circular cross-section into a meandering or zig-zag structure.

2. Prior Art

A prior art of the character described is disclosed for example in Japanese Patent Publication No. 39-9390 in which a cross-sectionally semi-circular monofilament is formed into a continuous meandering coupling element structure for mounting astride a longitudinal edge of each of a pair of stringer tapes. Although this prior publication fails to disclose any specific method of making such slide fastener coupling elements, it is believed that a monofilamentary material is spun, formed into an elongated cross-sectionally semi-circular monofilament and wound on a bobbin, from which the monofilament is supplied to a conventional apparatus for forming continuous rows of coupling elements having a meandering or zig-zag configuration. However, being semi-circular in cross-section, the monofilament is apt to become twisted or otherwise deformed when taken up on the bobbin, and it is extremely difficult, if not impossible, to correct the deformed posture of the monofilament so that its cross-sectional shape is reoriented and aligned on processing through the forming apparatus, leading to defective coupling element products.

SUMMARY OF THE INVENTION

It is therefore the primary object of the present invention to provide a method of forming a chain of meandering coupling elements for slide fastener from a cross-sectionally semi-circular monofilament with a great degree of accuracy and efficiency and without involving the problem of "twists".

The invention essentially comprises bifurcating or dividing a continuous length of substantially cross-sectionally circular monofilamentary material axially into substantially cross-sectionally semi-circular identical halves immediately prior to formation thereof into respective rows of meandering coupling elements for slide fastener.

According to the invention, there is provided a method of forming a chain of meandering coupling elements for slide fasteners which comprises dividing a continuous length of substantially cross-sectionally circular monofilamentary material along its longitudinal axis into substantially cross-sectionally semi-circular identical halves immediately prior to formation thereof into respective rows of meandering coupling elements each having leg portions and flattened-out coupling head portions.

The above object and other features of the invention will become more apparent from the following detailed description taken in conjunction with the accompanying drawings. Like reference numerals refer to like or corresponding parts throughout the several views.

DETAILED DESCRIPTION

Figure 1:
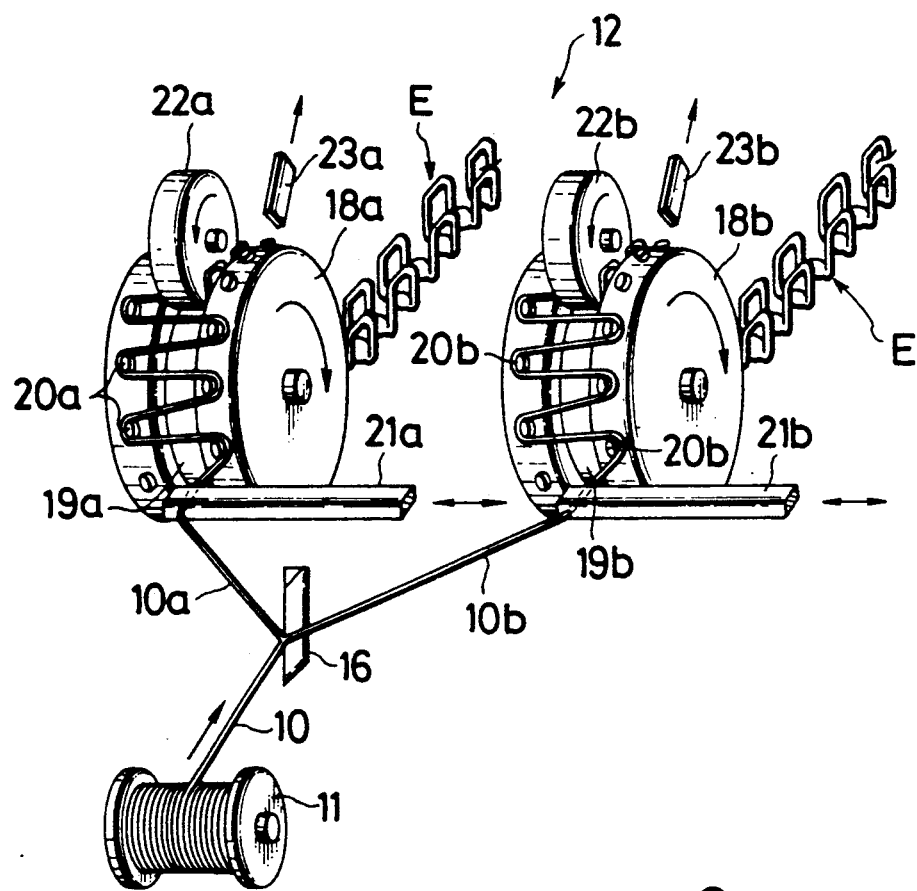
FIG. 1 is a schematic perspective view utilized to explain the manner in which a monofilament is bifurcated along its longitudinal axis according to the invention.

Referring now to the drawings and FIG. 1 in particular, there is shown a monofilament 10 having a substantially circular cross-section and wound on a bobbin 11. The monofilament 10 is spun from a thermoplastic resinous material such as polyester, nylon and the like to a diameter approximately in the range of 0.5 mm to 1.0 mm. According to the invention, the starting monofilament 10 as wound on the bobbin 11 is bifurcated or divided axially into identical halves 10a and 10b each having a semi-circular cross-section immediately prior to introduction to an element forming apparatus 12. The cross-sectionally circular monofilament 10 on the bobbin 11 may be prepared from two identical monofilaments of semi-circular cross-section which have been provisionally joined together at their respective planar surface 10a' and 10b' with use of an adhesive 13 as shown in FIG. 3, or which have been provisionally fitted snappingly together by means of longitudinal ridges 14 and grooves 15 formed at the planar surfaces 10a' and 10b' respectively as shown in FIG. 4 to provide a cross-sectionally circular monofilament 10.

The monofilament 10 thus consisting of two provisionally joined identical halves 10a and 10b is separated or bifurcated by a wedge-shaped separator 16 which has a triangular cross-section with its apex 17 serving as a separating or cutting edge along which the monofilament 10 is separated into cross-sectionally semi-circular halves immediately in advance to formation on the forming apparatus 12 as shown in FIG. 1.

Figure 2:
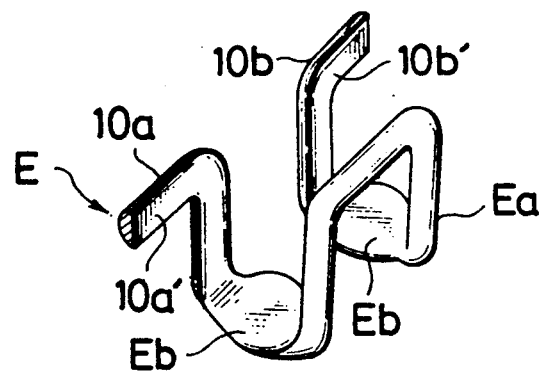
FIG. 2 is a perspective view on enlarged scale of one individual meandering coupling element in a row shown in FIG. 1.

Separated monofilament halves 10a and 10b of semi-circular cross-section are supplied to respective die-wheels 18a and 18b having respective peripheral shaping grooves 19a and 19b, in which instance the monofilament halves 10a and 10b are oriented with their respective planar surfaces 10a' and 10b' held upside up and passed around a plurality of shaping pins 20a and 20b extending radially outwardly from the respective die-wheels 18a and 18b. The shaping pins 20a and 20b are located on opposite sides of the shaping grooves 19a and 19b and distributed out of alignment with one another so that the cross-sectionally semi-circular monofilaments 10a and 10b are moved by respective reciprocating bars 21a and 21b transversely across the grooves 19a and 19b to train meanderingly around the shaping pins 21a and 21b. As the monofilaments 10a and 10b advance with rotation of the die-wheels 18a and 18b, they are pressed by respective bending rolls 22a and 22b into the shaping grooves 19a and 19b so as to form leg portions Ea of fastener coupling elements E in a continuous formation and thereafter deformed by respective punches 23a and 23b to produce flattened-out coupling head portions Eb of the elements E. The coupling elements E thus formed from the cross-sectionally semi-circular monofilaments 10a and 10b into a continuous meandering structure are heat-set and withdrawn from the apparatus 12. Each individual meandering element E is shown in FIG. 2.

Figure 3:
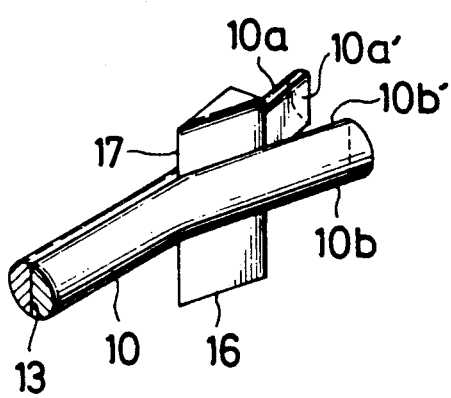
FIG. 3 is a schematic perspective view utilized to explain the manner of bifurcating the monofilament which has been pre-divided and pre-joined according to one embodiment of the invention.
Figure 4:
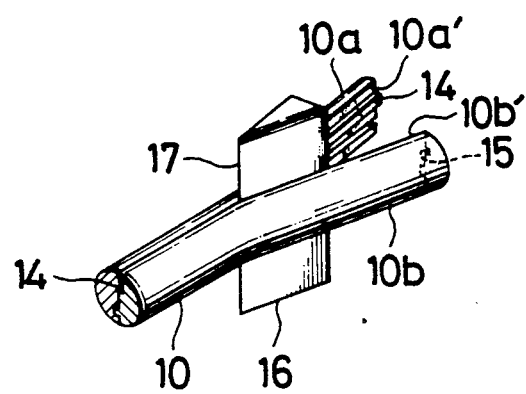
FIG. 4 is a schematic perspective view utilized to explain the manner of bifurcating the monofilament which has been pre-divided and pre-joined according to another embodiment of the invention.

The starting monofilament 10 having a fully circular cross-section is separated or bifurcated along its longitudinal axis into two identical cross-sectionally semi-circular working monofilaments 10a and 10b by means of the wedge-shaped separator 16 in a manner shown in FIGS. 3 and 4.

Figure 5:
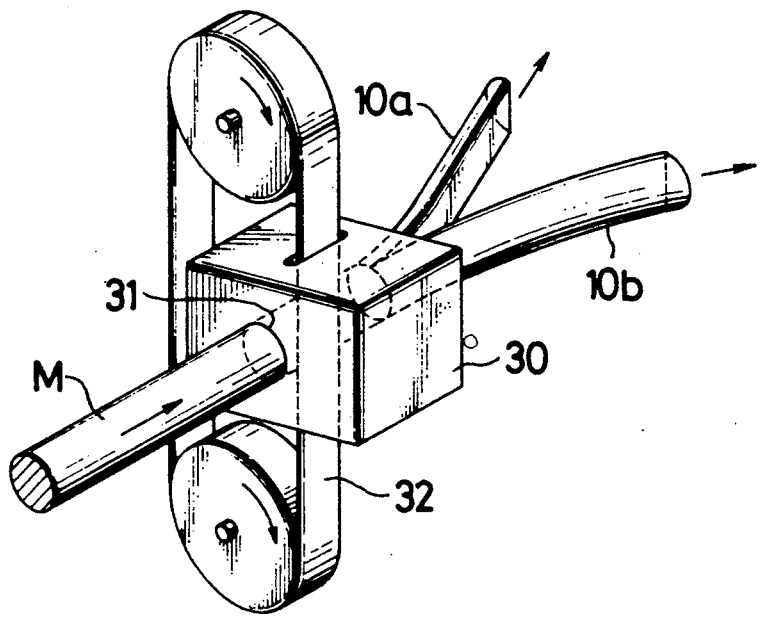
FIGS. 5, 6 and 7 each are schematic perspective views of respective means of cutting a cross-sectionally circular monofilament longitudinally apart into identical halves.

FIG. 5 shows a device for severing a cross-sectionally circular monofilamentary material M into two identical cross-sectionally semi-circular halves, which comprises a guide block 30 having a horizontally extending guide through aperture 31 through which the material M is fed in the direction of the arrow and a belt saw 32 rotating in the block 30 and adapted to cut the material M along a longitudinal axis thereof into halves 10a and 10b while the material M is moving.

Figure 6:
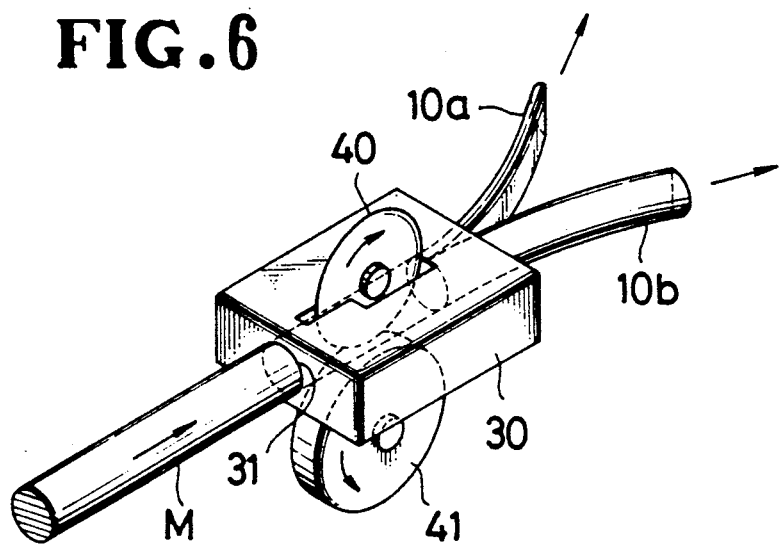

FIG. 6 shows another severing device comprising a cutting roll 40 coacting with a press roll 41 for cutting the material M into two identical cross-sectionally semi-circular halves 10a and 10b.

Figure 7:
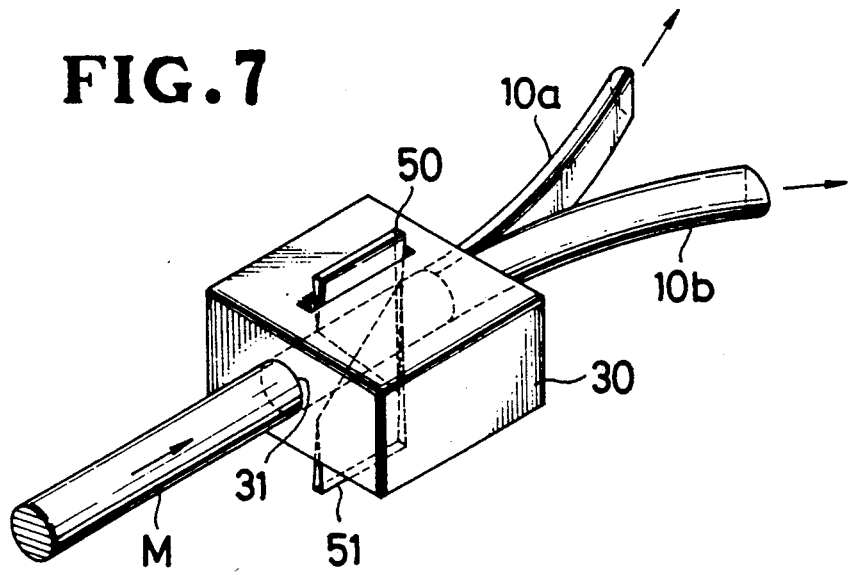

FIG. 7 shows still another severing device comprising coacting upper and lower cutting blades 50 and 51 for cutting the material M likewise into two identical halves 10a and 10b.

Figure 8:
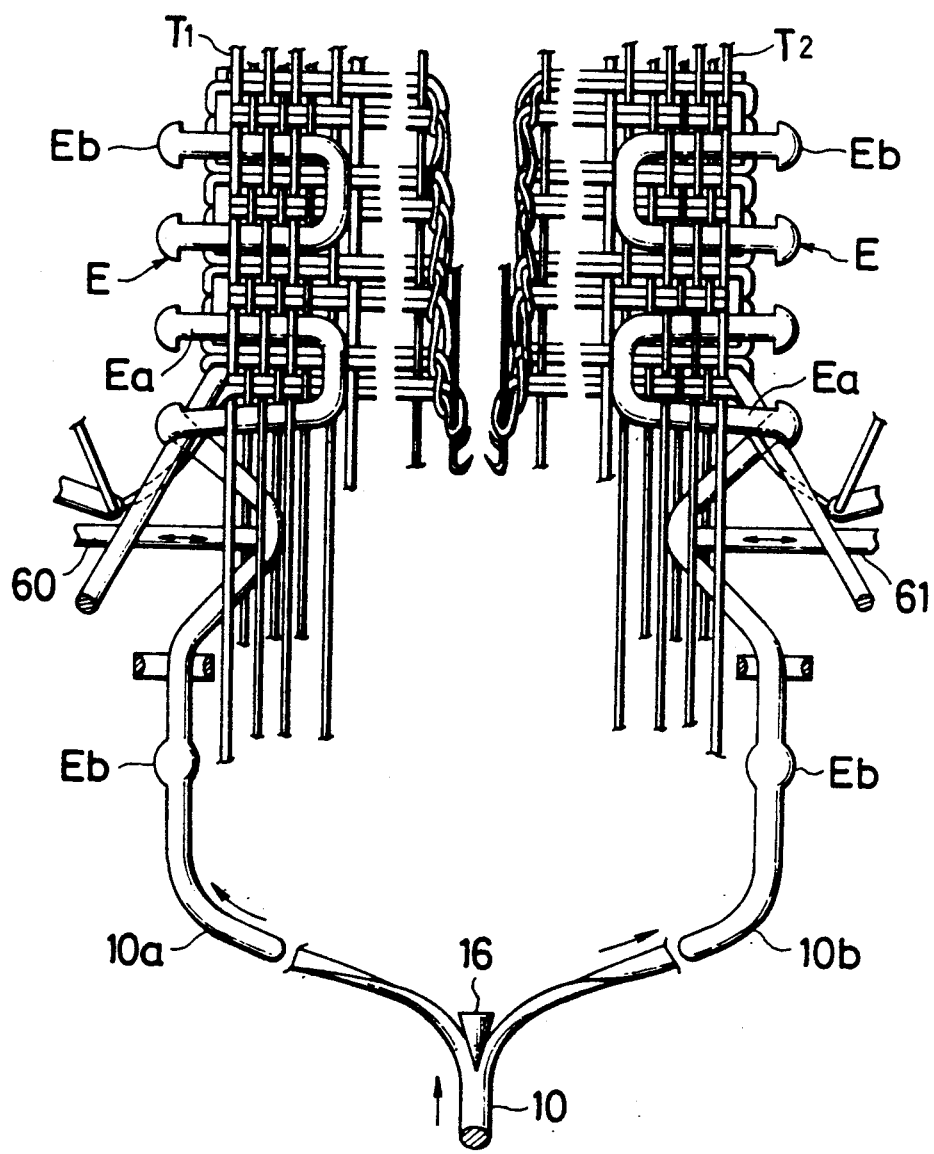
FIG. 8 is a schematic plan view utilized to explain the manner in which the monofilament in its bifurcated form is woven simultaneously with weaving threads into a tape system.

FIG. 8 shows the monofilament 10 being bifurcated by the separator 16 and woven into respective longitudinal edges of a pair of stringer tapes $T_1$ and $T_2$ for a slide fastener. The bifurcated monofilaments 10a and 10b are punched to form the coupling heads Eb at predetermined intervals as in the case of FIG. 1 and thereafter woven meanderingly by respective laying-in bars 60 and 61 on a needle loom into the system of the tapes $T_1$ and $T_2$ simultaneously as the latter are woven in a manner well known in the art.

Obviously, various modifications and variations of the present invention are possible in the light of the above teaching. It is therefore to be understood that within the scope of the appended claims the invention may be practiced otherwise than as specifically described.

What is claimed is:

1. A method of forming a chain of meandering coupling elements for slide fastener which comprises the steps of:

dividing a continuous length of substantially cross-sectionally circular monofilamentary material along its longitudinal axis into substantially cross-sectionally semi-circular identical halves;

supplying said monofilament halves to respective die-wheels having respective peripheral shaping grooves such that respective substantially plane surfaces of said monofilament halves are disposed upwardly;

passing said monofilament halves transversely across said shaping grooves and meanderingly around a plurality of shaping pins extending radially outwardly from said die-wheels and located and distributed on opposite sides of said shaping grooves in arrangement out of alignment with one another;

pressing said monofilament halves on said die-wheels by respectively bending rolls into said shaping grooves to form leg portions of fastener coupling elements; and deforming portions of said monofilament halves positioned on the bottom of said shaping grooves by respective punches to produce flattened-out coupling head portions of elements.

2. A method according to claim 1 in which said cross-sectionally circular monofilament comprises cross-sectionally semi-circular identical halves provisionally jointed together at their respective planar surface with use of an adhesive.

3. A method according to claim 1 in which said cross-sectionally circular monofilament comprises cross-sectionally semi-circular identical halves provisionally jointed together by means of longitudinal ridges and grooves formed at the planar surfaces respectively.

* * * * *